US010084313B2

(12) United States Patent
Berkcan et al.

(10) Patent No.: US 10,084,313 B2
(45) Date of Patent: *Sep. 25, 2018

(54) SELF-POWERED UTILITY DELIVERY SYSTEM

(71) Applicant: GENERAL ELECTRIC COMPANY, Schenectady, NY (US)

(72) Inventors: Ertugrul Berkcan, Niskayuna, NY (US); Roman Leon Artiuch, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,892

(22) Filed: Sep. 18, 2015

(65) Prior Publication Data

US 2017/0085083 A1    Mar. 23, 2017

(51) Int. Cl.
*H02J 3/00* (2006.01)
*G05B 15/02* (2006.01)
*G01D 4/00* (2006.01)
*G01F 15/00* (2006.01)

(52) U.S. Cl.
CPC ............... *H02J 3/00* (2013.01); *G01D 4/004* (2013.01); *G01F 15/00* (2013.01); *G05B 15/02* (2013.01); *Y02B 90/242* (2013.01); *Y02B 90/248* (2013.01); *Y04S 20/322* (2013.01); *Y04S 20/52* (2013.01)

(58) Field of Classification Search
CPC .............. G01D 4/002; Y10T 137/0324; E21B 41/0085; F03G 7/08; H02N 2/185; G01F 15/075; G01F 3/12
See application file for complete search history.

(56) References Cited

U.S. PATENT DOCUMENTS

| 3,164,020 A | 1/1965 | Groner et al. |
| 3,534,602 A | 10/1970 | Boyd |
| 4,555,637 A | 11/1985 | Irvine |

(Continued)

FOREIGN PATENT DOCUMENTS

| CN | 102900640 | 1/2013 |
| CN | 103557892 | 2/2014 |

(Continued)

OTHER PUBLICATIONS

Ahmad, Talha J., SPE Intelligent Energy, International 2013, Realising the Full Asset Value, Energy Harvesting Powered Wireless Monitoring and Control in Oil and Gas, 2013, pp. 857-868, https://www.onepetro.org/conference-paper/SPE-167486-MS.

(Continued)

*Primary Examiner* — Mirza Alam
(74) *Attorney, Agent, or Firm* — GE Global Patent Operation; Pabitra Chakrabarti

(57) ABSTRACT

The present disclosure relates to a self-powered utility delivery system that includes an energy generator that produces electrical energy and consequently regulates a pressure of utility flowing through the self-powered utility delivery system. Additionally, the self-powered utility delivery system includes an electronic utility meter that monitors a quantity (e.g., volume) of utility that flows through the self-powered utility delivery system and toward a consumer.

19 Claims, 7 Drawing Sheets

(56) References Cited

U.S. PATENT DOCUMENTS

| | | |
|---|---|---|
| 6,612,188 B2 | 9/2003 | Hamilton |
| 6,768,214 B2 | 7/2004 | Schultz et al. |
| 6,928,883 B2 | 8/2005 | Lehker et al. |
| 7,349,813 B2 | 3/2008 | Gutierrez et al. |
| 7,560,856 B2 | 7/2009 | Chen et al. |
| 7,906,861 B2 | 3/2011 | Guerrero et al. |
| 8,299,937 B2 * | 10/2012 | Wang ............... G01F 1/10 210/747.1 |
| 8,511,373 B2 | 8/2013 | Tosi et al. |
| 8,564,179 B2 | 10/2013 | Ochoa et al. |
| 8,604,634 B2 * | 12/2013 | Pabon ............ E21B 41/0085 166/65.1 |
| 2004/0113812 A1 * | 6/2004 | Bianchi ............... H04Q 9/00 340/870.02 |
| 2004/0123656 A1 * | 7/2004 | Castleberry ......... G01D 4/006 73/197 |
| 2005/0049755 A1 | 3/2005 | Boger |
| 2009/0114396 A1 | 5/2009 | Kusko et al. |
| 2009/0236852 A1 | 9/2009 | Balzano |
| 2009/0309755 A1 * | 12/2009 | Williamson ......... G01D 4/004 340/870.02 |
| 2012/0022812 A1 * | 1/2012 | Longtin ............. G01D 4/008 702/60 |
| 2012/0026007 A1 * | 2/2012 | Beattie ............. G01D 4/002 340/870.02 |
| 2012/0274478 A1 | 11/2012 | Stenson et al. |
| 2013/0300574 A1 * | 11/2013 | Gillette, II ........ G01N 33/0009 340/870.01 |
| 2014/0327553 A1 | 11/2014 | Whitaker et al. |
| 2015/0102603 A1 | 4/2015 | Schaefer et al. |
| 2015/0236551 A1 | 8/2015 | Shearer et al. |

FOREIGN PATENT DOCUMENTS

| | | | |
|---|---|---|---|
| CN | 104213939 | 12/2014 | |
| DE | 102011107442 A1 | 1/2013 | |
| EP | 2080999 A1 | 7/2009 | |
| KR | 20020094995 A | 12/2002 | |
| WO | WO 2011014187 A1 * | 2/2011 | ............ G01F 1/075 |
| WO | 2013189505 A1 | 12/2013 | |
| WO | 2014100496 A1 | 6/2014 | |

OTHER PUBLICATIONS

Sobral, Tallita, Wireless Sensor Network for Oil & Gas Industry, Nov. 2012, pp. 1-16, www.siliconreef.com.br/site/assets/public/files/whitepapers/c064d2584c5c6d8dde65be9fcebe10aa.pdf.

PCT Search Report and Written Opinion issued in connection with Related PCT Application No. PCT/US2016/046101 dated Nov. 11, 2016.

PCT Search Report and Written Opinion issued in connection with corresponding PCT Application No. PCT/US2016/050469 dated Nov. 30, 2016.

* cited by examiner

SELF-POWERED UTILITY DELIVERY SYSTEM

BACKGROUND

The subject matter disclosed herein relates to a utility delivery system, and specifically, to a self-powered utility delivery system.

Utility service providers place utility meters at various locations to monitor usage of a supplied utility (e.g., gas and/or water), thereby enabling proper billing for the supplied utility. For example, a service provider may activate a utility meter at a start of utility service, and periodically obtain or receive readings from the utility meter during service. Accordingly, the utility meter may transmit consumption information to the utility service provider via wireless and/or wired transmissions.

A pressure of the utility supplied by the service provider is typically relatively high. Accordingly, a pressure regulator may be positioned upstream from a utility meter so that the pressure of the utility is reduced to a level that enables the utility meter to accurately measure an amount of utility flowing to a consumer. Additionally, a regulator may reduce the pressure of the utility to a suitable level for consumption (e.g., at or below flow consumption specifications). As technology has improved, electronic (e.g., advanced) utility meters have been utilized to measure and to transmit consumption data from a utility meter to a utility service provider (e.g., via wireless communications). However, such electronic meters, while convenient, may utilize external power to operate. In some instances, utility meters may not be positioned proximate to a source of power. Additionally, utilizing batteries as a source of power may be undesirable because regular replacement of the batteries may be performed to maintain constant operation of the utility meter.

BRIEF DESCRIPTION

In one embodiment, a self-powered utility delivery system includes an inlet port configured to receive a utility at a first pressure, an outlet port configured to supply the utility at a second pressure, where the utility is configured to flow between the inlet port and the outlet port, an electronic meter providing one or both of processor-mediated communications or signal processing and configured to measure the utility supplied from the outlet port, and a power generator configured to generate electrical power, where generation of the electrical power results in regulation of the utility from the first pressure to the second pressure.

In another embodiment, a method includes receiving a utility through an inlet port, where the utility is at a first pressure, generating electrical power using a power generator, where generating the electrical power results in regulating a pressure of the utility from the first pressure to a second pressure, supplying the electrical power to an electronic meter, where the electronic meter is configured to provide one or both of process-mediated communications or signal processing, supplying the utility to a consumer at the second pressure through an outlet port, and monitoring a volume of the utility supplied to the consumer using the electronic meter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
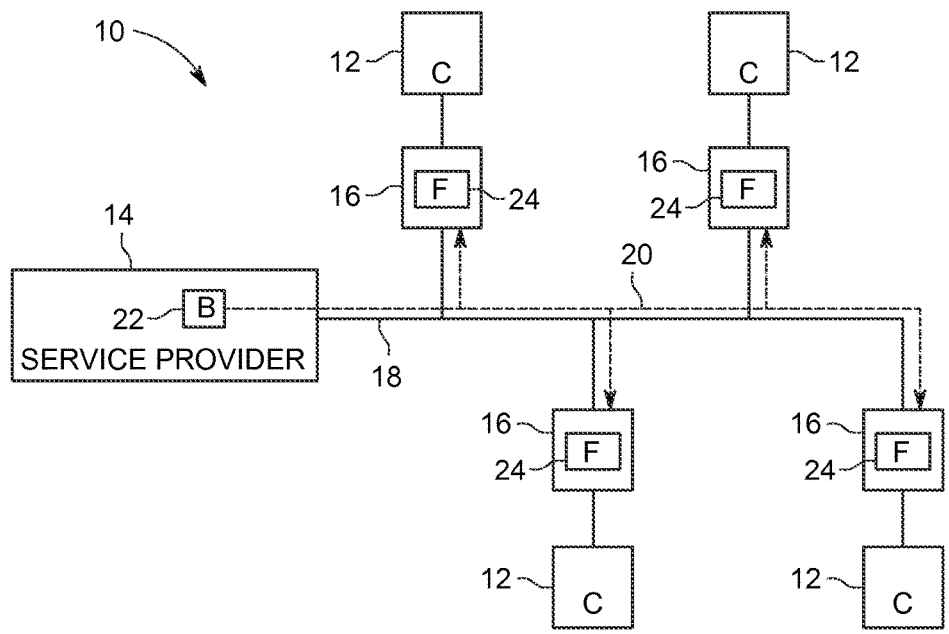
FIG. 1 is a block diagram of a utility generation, transmission, and distribution system, in accordance with an aspect of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Utility service providers may supply a utility to consumers via various pipelines, cables, and/or other transmission networks. As used herein, a utility may include natural gas, water, a fluid, or the like. In order to determine a quantity of a given utility that a consumer utilizes, a meter may be installed so that the service provider may monitor consumption of the utility. For example, utility meters may be located along a utility supply pipeline and near to a structure (e.g., commercial building or residential home) where the utility may be consumed. Therefore, a service provider may monitor how much utility flows from the supply pipeline to the structure, and charge the consumer accordingly (e.g., a price per unit of a measured quantity).

Traditionally a regulator may be disposed upstream of the utility meter along the supply line such that the pressure of the utility flowing through the utility meter may be at a suitable level. For example, supply lines may include the utility at relatively high pressures so that the utility in the supply line may be supplied to multiple consumers located over a relatively large distance or area. In certain cases, the pressure of the utility in the supply line may be too high for the utility meter to receive (e.g., a utility meter may be rated for receiving a utility up to a threshold pressure). Therefore, the regulator may enable the utility meter to receive the supplied utility at an appropriate pressure and enable the utility meter to accurately monitor consumption of the utility. In other embodiments, the regulator may be disposed downstream from the utility meter, such as in cases where it may be desirable to operate the meter at a higher incoming pressure.

As technology has advanced, utility meters have increased in complexity. For example, utility meters may be configured to monitor a quantity of utility (e.g., natural gas or water) consumption and wirelessly transmit a signal to the service provider. Therefore, the service provider may monitor an amount of the utility consumed remotely, thereby eliminating physical readings of the utility meter. However, such advanced utility meters (e.g., electronic utility meters) may be powered by an external power supply. In some cases, advanced utility meters (e.g., electronic utility meters) may be powered by a battery or another power source located proximate to the meter. It is now recognized that such external power supplies may be undesirable as the service provider may undergo routine service trips to replace the power supply (e.g., batteries) to ensure that the utility meter has a constant supply of electricity. When the utility meter has a constant supply of electrical energy, the service provider may receive constant, up-to-date signals regarding utility consumption by the consumer at a given location.

It is now recognized that utilizing a power generator to supply power to an advanced utility meter (e.g., an electronic utility meter) may eliminate use of an external power supply. Moreover, generation of the power using the power generator may also regulate a pressure of a utility (e.g., natural gas or water), thereby eliminating inclusion of a separate regulator device. For example, an energy generator may create power by utilizing the relatively high pressure of the utility in the supply line. The energy generator may produce electrical energy while simultaneously decreasing a pressure of the utility from a utility pressure to an intermediate pressure. In some cases, the intermediate pressure may be suitable for the advanced utility meter (e.g., at or below a predetermined pressure limit of the utility meter). Further, the advanced utility meter may decrease the pressure of the utility from the intermediate pressure to a consumption pressure. Accordingly, the power generator may supply power to the electronic utility meter (e.g., advanced utility meter), and consequently regulate the pressure of the utility such that the utility is received by the electronic utility meter (e.g., advanced utility meter), and thus the consumer, at a suitable level.

By way of introduction, FIG. 1 describes a utility distribution and metering system 10. More specifically, the utility distribution and metering system 10 distributes a utility (e.g., natural gas or water) to various consumers 12 from a service provider 14 and monitors the utility usage by the consumers 12 via utility meters 16. As depicted, the service provider 14 distributes utilities to the various consumers 12 through a distribution network 18. For example, when the service provider 14 is providing natural gas, the distribution network 18 may be a system of gas pipelines.

As described above, the utility meters 16 monitor the utility usage of the various consumers 12, which may include commercial and/or residential consumers. As depicted, each consumer's usage may be monitored by a separate utility meter 16. In some embodiments, the utility meters 16 may be a diaphragm meter, a rotary meter, a turbine meter, an orifice meter, an ultrasonic flow meter, a coriolis meter, or any other suitable meter for measuring a quantity of utility flow. Additionally or alternatively, the utility meters 16 may be an electronic utility meter (e.g., an advanced utility meter) such as a DigitalFlow™ CTF868 flow meter, a DigitalFlow™ GM868 flow meter, a DigitalFlow™ GC868 flow meter, a DigitalFlow™ XGF868 flow meter, a PanaFlow™ Z3 flow meter, and/or a Sentinel flow meter made available by General Electric Company of Schenectady, N.Y., and meters such as DVC meters also manufactured by General Electric of Schenectady, N.Y. More specifically, each utility meter 16 may gather data that characterizes the consumer's utility usage such as maximum utility demand, minimum utility demand, demand interval length, time of use (TOU) calendars, status information, and the like. In some embodiments, the data gathered by the utility meter 16 may be communicated to the service provider 14 via a communication network 20. In some embodiments, the communication network 20 may be a wireless system that transmits wireless signals to the service provider 14 from the utility meter 16, and vice versa.

As a non-limiting example, a utility meter 16 may communicate the gathered data (e.g., utility usage data) to the service provider's billing system 22. In some embodiments, the utility usage data may include total utility usage and maximum utility demanded to enable the service provider 14 to bill the consumer 12. Accordingly, the billing system 22 may be included in one or more computing devices, such as a workstation, mobile device, or desktop computer. Additionally, the communication network 20 may be wired, wireless, or both. For example, a utility meter 16 may wirelessly communicate with a handheld meter reader or communicate via a smart grid. In some embodiments, the communication network 20 may include advanced metering infrastructure (AMI) to enable two-way communication between the service provider 14 and the utility meters 16. For example, this may enable the service provider 14 to schedule disconnection or connection of services, automatic meter reading (AMR), transmitting utility meter firmware updates, and the like.

In certain embodiments, the utility meter 16 may include advanced metering functionality, processor-mediated communications, and/or signal processing. Advanced metering functionality, processor-mediated communications, and/or signal processing may include functionality such as electronic measurement (e.g., receiving signals from sensors in the utility meter 16), flow sensing (e.g., measuring an amount of flow based on signals received from sensors in the utility meter 16), volume flow metering (e.g., measuring an amount of volume flowing through the utility meter 16 using sensors in the utility meter 16), volume conversion (e.g., converting a flow of utility to a total volume consumed using base conditions), self-diagnostics (e.g., utility meter 16 determines whether measurement is valid or predictively evaluates likelihood of a service event), electronic display, meter correction (e.g., account for abnormal temperatures, pressures, and/or flow measurements), communication with the service provider 14 (e.g., initiated via automatic meter reading), another form of signal processing, or any combination thereof. Initiation of the processor-mediated communications and/or signal processing may occur via manual interaction with the utility meter 16 or initiation may occur automatically (e.g., via automatic meter reading).

Additionally, the utility meter 16 may be configured to meter an amount of utility that is ultimately provided to the consumer 12. For example, the utility meter 16 may be adjusted (e.g., via an actuator) to control an amount of the utility supplied to the consumer 12. In certain embodiments, metering the utility via the utility meter 16 may also utilize electricity.

Figure 2:
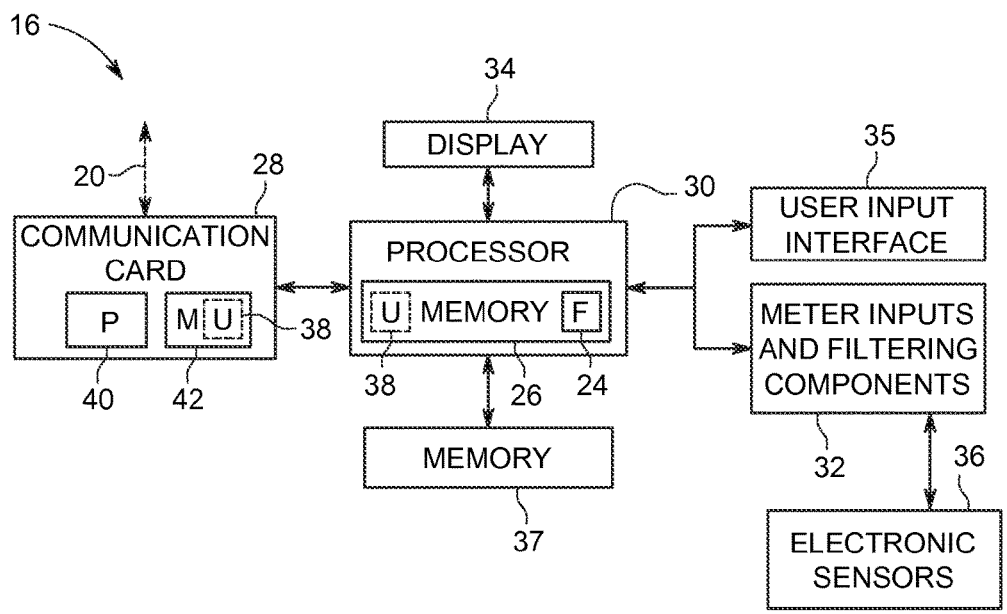
FIG. 2 is a block diagram illustrating components of a utility meter of FIG. 1, in accordance with an aspect of the present disclosure.

As described above, to facilitate the processor-mediated communications and/or signal processing, the utility meter 16 may include firmware 24. As depicted in FIG. 2, the firmware 24 may be stored in memory 26 of the utility meter 16. Additionally, to facilitate functions of the utility meter 16, the utility meter 16 may include a communication system 28 (e.g., communications card), one or more processor(s) 30, meter inputs/filtering components 32, a display 34, and a user input interface 35. In certain embodiments, electronic signals received within the utility meter 16 may be filtered, amplified, digitized, or the like. For example, the utility meter 16 may include the meter inputs and filter components 32, which may perform such manipulations on measurements received from various electronic sensors 36, such as flow sensors and/or pressure sensors (e.g., electronic sensors and/or mechanical sensors) included within the utility meter 16. The meter inputs and filter components 32 may include a separate processor, application specific integrated circuit (e.g., ASIC), or other computing device to perform such manipulations. Further, either before or after manipulation, the electronic signals may be saved in the memory 26 of the utility meter 16 and/or sent to the service provider 14 for billing the consumer 12.

As shown in the illustrated embodiment of FIG. 2, the memory 26 may be included in the processor 30. In other embodiments, the memory 26 may be separate from the processor 30 and included as another component of the utility meter 16. Additionally or alternatively, a second memory device 37 may be included for storing signals related to measurements of flow and/or volume of the utility (e.g., either manipulated or non-manipulated). In any case, the utility meter 16 includes a plurality of components that operate utilizing electricity, and therefore, may utilize a power source to operate.

Additionally, as shown in the illustrated embodiment of FIG. 2, the meter inputs and filter components 32 are operatively coupled to the processor 30 to communicate the collected data to the processor 30. More specifically, the processor 30 may perform various monitoring and/or control functions. For example, the processor 30 may adjust a pressure regulator, a valve included in the utility meter 16, and/or another device (e.g., an energy generator) configured to regulate a pressure of utility to the consumer 12 so that the pressure supplied to the consumer 12 meets any standards or regulations that govern consumption pressure levels (e.g., flow consumption specifications). To facilitate these various functions, the processor 30 may also be operatively coupled to the memory 26 that stores content, data, instructions, or the like. For example, memory 26 may be a tangible non-transitory medium that may store data (e.g., utility usage data) transmitted to/from the utility meter 16 as well as instructions (e.g., firmware 24) that enable the processor 30 to execute steps associated with operation of the utility meter 16. In some embodiments, the firmware 24 may be stored in flash upgradable memory, but the memory 26 may include additional read only memory (ROM). Accordingly, the memory 26 may include non-volatile memory (e.g., an upgradable portion, ROM, hard disks, or magnetic tape) as well as volatile memory (e.g., random-access memory).

Additionally, the display 34 and the user input interface 35 enable a user (e.g., the consumer 12 or the service provider 14) to interact directly (e g, manually) with the utility meter 16. For example, the display 34 may communicate information to the user by displaying information such as utility usage, instantaneous utility usage, error messages, meter status, and the like. Accordingly, the display 34 may be a light-emitting diode (LED) display, a liquid crystal display (LCD), or the like. The user input interface 35 may receive user inputs. For example, the user input interface 35 may enable the user to configure the meter 16, select different information to display, and the like. Accordingly, the user input interface 35 may include a keypad, a joystick, a touch-screen display, a data input device (e.g., CD-Drive or USB port), or the like. In some embodiments, the user input interface 35 may be configured to wirelessly communicate such information displayed on, and/or input into, the user input interface 35 to the utility service provider 14 via the communication network 20.

In certain embodiments, the utility meter 16 may interface with the communication network 20 via the communication card 28. In other words, the communication card 28 enables the utility meter 16 to communicate with the service provider 14, or other entities (e.g., regulatory entities). As described above, the communication network 20 may enable two-way communication between the utility meter 16 and the service provider 14. Therefore, in addition to transmitting data, such as utility usage data, from the utility meter 16 to the service provider 14, the communication card 28 may receive data, such as firmware updates 38, from the service provider 14. To facilitate the communication with the service provider 14, the communication card 28 may share the processor 30 and memory 26. Additionally or alternatively, the communication card 28 may include a dedicated processor 40 and/or memory 42.

As discussed above, the utility meters 16 include electronic components (e.g., the firmware 24, the memory 26, the communication system 28, the processor 30, the meter inputs and filter components 32, the display 34, and/or the user input interface 35) that may operate using electrical energy. Traditionally, separate and/or external power supplies (e.g., batteries or electrical cords) have been utilized to provide electricity to the utility meters 16 such that the utility meter 16 may monitor utility usage (e.g., consumption) and/or meter the utility, as well as communicate data to the service provider 14. However, such external power supplies may be undesirable because periodic service trips may be performed to determine whether the external power supply is providing sufficient electrical energy to the utility meter 16 and/or whether the utility meter 16 is in working order. Therefore, it is now recognized that power (e.g., electrical energy) may be generated by utilizing a pressure drop of utility in a utility supply line. Accordingly, such resulting power may be provided to the utility meter 16 such that the electronic components may receive a sufficient supply of electrical energy. Further, generating the power may consequently result in regulation of an outlet pressure of utility flowing through the utility meter 16. In certain embodiments, the utility meter 16 may be included in a self-powered utility delivery system, which may also include an energy generator.

Figure 3:
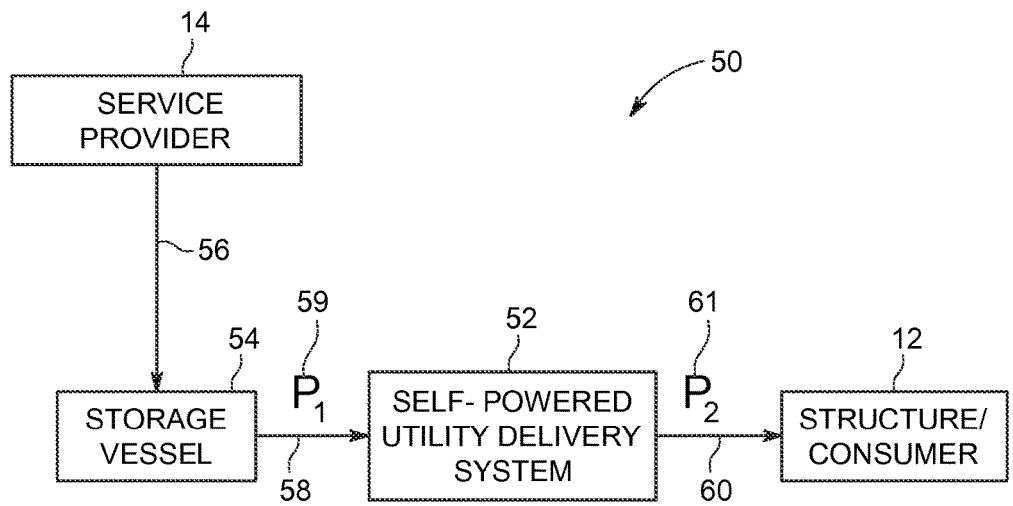
FIG. 3 illustrates an embodiment of an overall process that may utilize a self-powered utility delivery system, in accordance with an aspect of the present disclosure.

FIG. 3 illustrates an embodiment of an overall process 50 that may utilize the self-powered utility delivery system 52. For example, the service provider 14 may obtain a supply of a utility (e.g., natural gas or water) from a processing plant and/or another source (e.g., a subterranean formation). The service provider 14 may then transfer the utility (e.g., natural gas or water) to a storage vessel 54 (e.g., a tank or other storage device). The storage vessel 54 may receive the utility (e.g., natural gas or water) via a pipeline 56 and hold the utility (e.g., natural gas or water) until a demand for such utility (e.g., natural gas or water) is made by the consumer 12. The utility may then flow through a supply pipeline 58 and through the self-powered utility delivery system 52. In certain embodiments, the self-powered utility delivery system 52 may generate electricity to power the utility meter 16 and consequently regulate a pressure of the utility, such that the utility is suitable for consumption (e.g., within flow consumption specifications). For example, the utility may be stored in the storage vessel 54 at a first pressure 59, which may be relatively high when compared to a pressure that regulations and/or specifications identify as appropriate for consumption. Therefore, the self-powered utility delivery system 52 may perform a dual function in both generating electricity and consequently regulating a pressure of the utility flowing through the self-powered utility delivery system 52.

Additionally, the self-powered utility delivery system 52 utilizes the generated electricity (e.g., electrical energy or power) to provide information to the service provider 14 related to utility consumption (e.g., a flow of the utility through the self-powered utility delivery system 52). Further, the self-powered utility delivery system 52 may transmit feedback (e.g., a wireless signal) to the service provider 14 such that the service provider 14 may monitor consumption of the utility remotely (e.g., at a location different than that where the self-powered utility delivery system 52 is positioned).

Upon exiting the self-powered utility delivery system 52, the utility may flow through a consumption pipeline 60 at a second pressure 61 and toward the consumer 12 (e.g., a house, apartment, office). In certain embodiments, the utility may be natural gas. Accordingly, the consumer 12 may utilize the gas as a fuel in a wide variety of settings, including heaters, gas stoves and ovens, dryers, water heaters, incinerators, glass melting systems, food processing plants, industrial boilers, electrical generators, among numerous others. In other embodiments, the utility may be utilized in any suitable manner.

Figure 4:
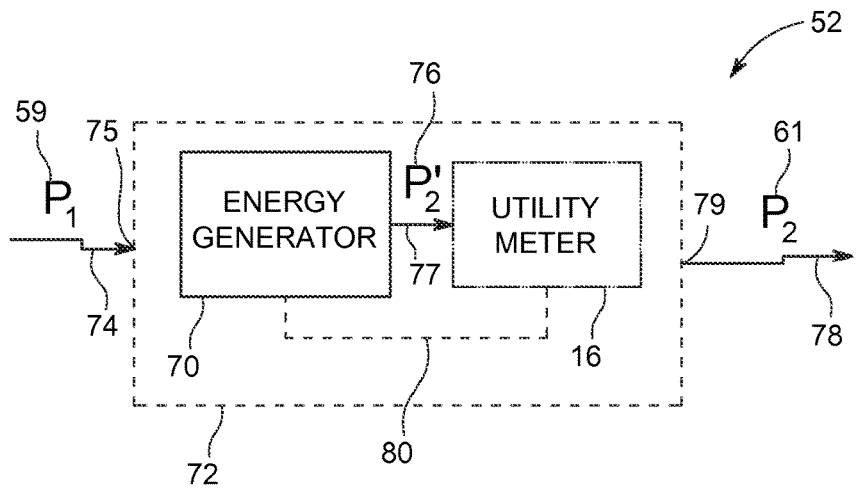
FIG. 4 illustrates a block diagram of the self-powered utility delivery system of FIG. 3, in accordance with an aspect of the present disclosure.

As discussed previously, a traditional utility meter used to monitor utility (e.g., natural gas or water) consumption, may be powered by an external power supply (e.g., a battery or wired power cable). Conversely, the self-powered utility delivery system 52 may be configured to utilize a relatively high pressure (e.g., the first pressure 59) of the utility entering the self-powered utility delivery system 52 to generate electrical energy and power a utility meter 16 included in the self-powered utility delivery system 52. For example, FIG. 4 illustrates an embodiment of the self-powered utility delivery system 52 that does not include an external power supply. As shown in the illustrated embodiment of FIG. 4, the self-powered utility delivery system 52 includes an energy generator 70 and the utility meter 16 as separate components. In certain embodiments, the energy generator 70 and the utility meter 16 are positioned in a housing 72 of the self-powered utility delivery system 52. As shown in the illustrated embodiment, the energy generator 70 is upstream of the utility meter 16 in the housing 72. Accordingly, the self-powered utility delivery system 52 may receive a supply flow 74 of the utility (e.g., natural gas at the first pressure 59) via an inlet port 75 of the housing 72. The utility in the supply flow 72 may be at the first pressure 59, which may be relatively high in comparison to consumption standards and specifications (e.g., flow consumption specifications). Accordingly, the high pressure 59 may enable the service provider 14 to supply the utility (e.g., natural gas or water) to numerous locations simultaneously (e.g., higher pressure directs the utility to a greater number of locations because the utility may flow from a high pressure to a low pressure) over a large distance and/or area. However, prior to the consumer 12 receiving the utility, the pressure of the utility may be reduced as a result of the generation of electrical energy by the energy generator 70. It should be noted that in other embodiments, the utility meter 16 may be positioned upstream of the energy generator 70, such as when it is desirable to supply the utility meter 16 with the utility at a relatively high incoming pressure. Such a configuration is discussed in more detail below with reference to FIG. 5.

For example, the energy generator 70 may utilize the relatively high, first pressure 59 of the supply flow 74 to create electrical energy (e.g., power may be generated by using the supply flow 74 to turn a rotor of a turbine). In certain embodiments, the energy generator 70 may harvest power via vibrations (e.g., a vibration powered generator), pressure fluctuations (e.g., a turbine), flow dynamics of the utility, pressure drops, temperature differentials (e.g., a thermoelectric generator), magnetic and/or electromagnetic fluctuations (e.g., an inductive harvester), or any combination thereof. In certain embodiments, as a result of power generation, the pressure of the utility exiting the energy generator 70 may decrease to an intermediate pressure 76 and an intermediate flow 77 of the utility (e.g., natural gas or water) may be directed from the energy generator 70 to the utility meter 16. Accordingly, the utility (e.g., natural gas or water) may enter the utility meter 16 at the intermediate pressure 76. In certain embodiments, the intermediate pressure 76 may be a suitable pressure for the utility meter 16 to receive and accurately monitor the utility consumption by the consumer 12.

The utility meter 16 may then monitor an amount (e.g., volume) of the utility (e.g., natural gas or water) that flows through the utility meter 16 and toward the consumer 12. For example, in certain embodiments, the utility meter 16 may monitor a velocity, flow rate, temperature, pressure, and/or other variable to determine a quantity (e.g., volume) of the utility (e.g., natural gas or water) flowing from the supply pipeline 58 to the consumer 12 (e.g., by using the electronic sensors 36). Accordingly, the utility meter 16 may transmit a signal to the service provider 14 regarding how much of the utility was consumed by the consumer 12 so that the service provider 14 may charge the consumer 12 in proportion to consumption.

In certain embodiments, the utility meter 16 may also cause a pressure of the utility to decrease (e.g., as a result of measurements taken by the utility meter 16). Therefore, the utility exiting the utility meter 16 may be at a pressure suitable for use by the consumer 12 (e.g., the pressure of the utility exiting the utility meter 16 may be at or below the flow consumption specifications). When the utility exits the utility meter 16, the utility may exit the self-powered utility delivery system 52 via an outlet port 79. In some embodiments, the outlet of the utility meter 16 may also serve as the outlet port 79 of the self-powered utility delivery system 52. The utility may then flow from the outlet port 79 to the consumer 12 (e.g., toward an oven, water heater, and/or other device that utilizes the utility) via a consumption flow path 78. In certain embodiments, the utility meter 16 may consequently reduce the pressure of the utility from the intermediate pressure 76 to the second pressure 61. Accordingly, the consumer 12 may receive the utility at a suitable pressure, such that the consumer 12 may utilize the utility as desired (e.g., for fuel).

In certain embodiments, the power generated by the energy generator 70 may be supplied to the utility meter 16, such that electronic components of the utility meter 16 may operate. Therefore, an electrical connection 80 (e.g., an electrical cord or other electrical coupling device) may exist between the energy generator 70 and the utility meter 16 to provide electricity to the utility meter 16. However, in some cases it may be desirable to integrate the utility meter 16 and the energy generator 70 into a single component such that the electrical connection 80 may be shortened or, in some cases, eliminated.

Figure 5:
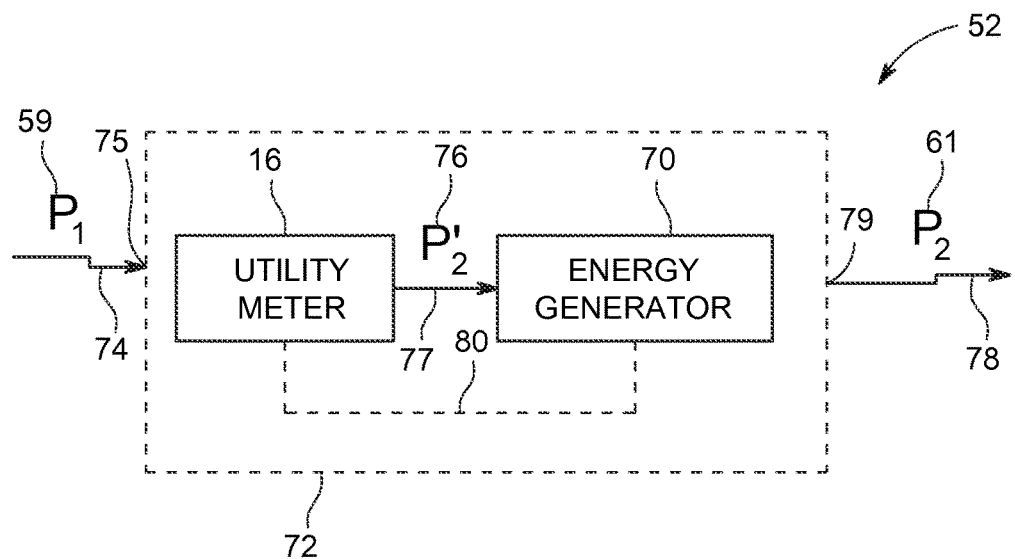
FIG. 5 illustrates a block diagram of the self-powered utility system of FIG. 3 having the utility meter upstream of the energy generator; in accordance with an aspect of the present disclosure.

It should be noted that in other embodiments, the utility meter 16 may be positioned upstream of the energy generator 70, such as when it is desirable to supply the utility meter 16 with the utility at a relatively high incoming pressure. For example, FIG. 5 illustrates the self-powered utility distribution system 52 having the energy generator 70 disposed downstream of the utility meter 16 in the housing 72. Accordingly, the self-powered utility delivery system 52 may receive the supply flow 74 of the utility (e.g., natural gas at the first pressure 59) via the inlet port 75 of the housing 72. The utility in the supply flow 74 may be at the first pressure 59, which may be relatively high. The utility meter 16 may receive the utility and monitor and/or measure a pressure, flow rate, and/or flow volume of the utility through the self-powered utility distribution system 52. In certain embodiments, the utility may incur a decrease in pressure through the utility meter 16, such that the intermediate flow 77 is at the intermediate pressure 76. When the utility meter 16 is upstream of the energy generator 70, the intermediate pressure 76 of the utility in the intermediate flow 77 may be higher than the intermediate pressure 76 when the utility meter 16 is downstream of the energy generator 70. Therefore, the energy generator 70 may still produce a sufficient amount of energy to power the utility meter 16. When the utility flows through the energy generator 70, power may be produced. The utility may then decrease in pressure to the second pressure 61, which may be suitable for consumption by the consumer 12, and flow toward the consumer via the outlet port 79 and consumption flow path 78.

Figure 6:
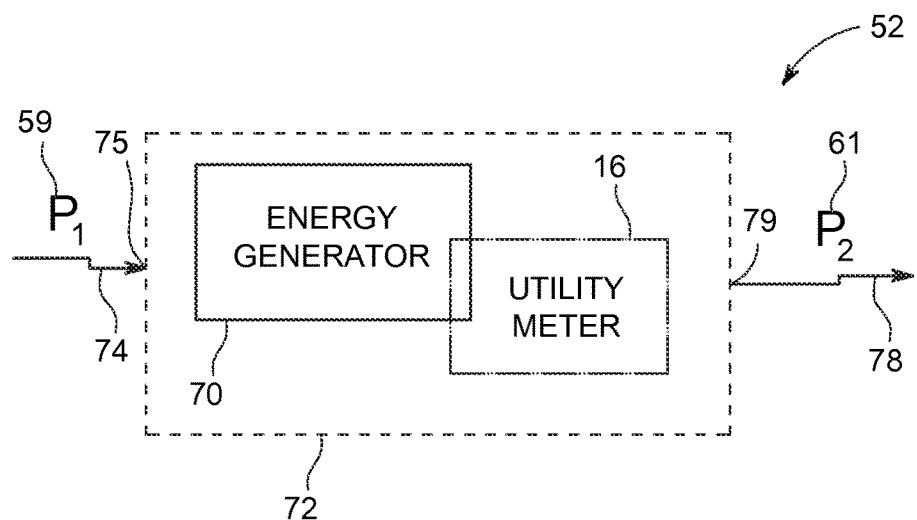
FIG. 6 illustrates a block diagram of the self-powered utility delivery system of FIG. 3 where an energy generator and a utility meter are integrated into a single component, in accordance with an aspect of the present disclosure.

FIG. 6 illustrates an embodiment of the self-powered utility delivery system 52 where the energy generator 70 and the utility meter 16 are integrated into a single component. For example, the energy generator 70 may include one or more electronic sensors (e.g., flow sensors and/or pressure sensors; meter inputs/filtering components) that are configured to monitor a flow of the utility (e.g., natural gas or water) through the energy generator 70 (e.g., the electronic sensors 36). In certain embodiments, the electronic sensors may be pressure transducers or flow transducers that determine the quantity (e.g., volume) of the utility transferred from the supply pipeline 58 (e.g., the supply flow) to the consumer 12.

The energy generator 70 may generate power utilizing a dynamic pressure of the utility (e.g., natural gas or water) flowing through the energy generator 70. For example, the dynamic pressure may be a measure of kinetic energy per unit volume of the utility (e.g., natural gas or water). Therefore, the energy generator 70 may harvest kinetic energy of the utility flowing through the energy generator 70, which may result in a pressure drop (and consequently a decrease in velocity) of the utility. In some embodiments, the energy generator 70 may include a rotor that spins as a result of the utility flowing through the energy generator 70. The rotor may generate electrical energy, and accordingly, decrease the pressure of the utility as well as the velocity of the utility. In other embodiments, the energy generator 70 may include other energy harvesting devices, as discussed in more detail below with reference to FIGS. 11 and 12.

However, in some embodiments, the energy generator 70 may not produce a substantial amount of power when a flow of the utility through the energy generator 70 is absent. When there is no demand for the utility from the consumer 12, the utility in the supply pipeline 58 (e.g., the supply flow 74) as well as the utility in the consumption pipeline 60 (e.g., the consumption flow 78) may be substantially static (e.g., a velocity of approximately zero), such that the utility does not flow through the self-powered utility delivery system 52. Rather, the utility may remain substantially stationary with respect to the self-powered utility delivery system 52. In such embodiments, the energy generator 70 may not produce a substantial amount of power during such times because of the absence of a dynamic pressure of the utility. As a result, the supply of electricity provided to the utility meter 16 may decrease, which may eventually cause the service provider 14 to lose a connection with the utility meter 16, and thus the ability to monitor consumption of the utility.

Figure 7:
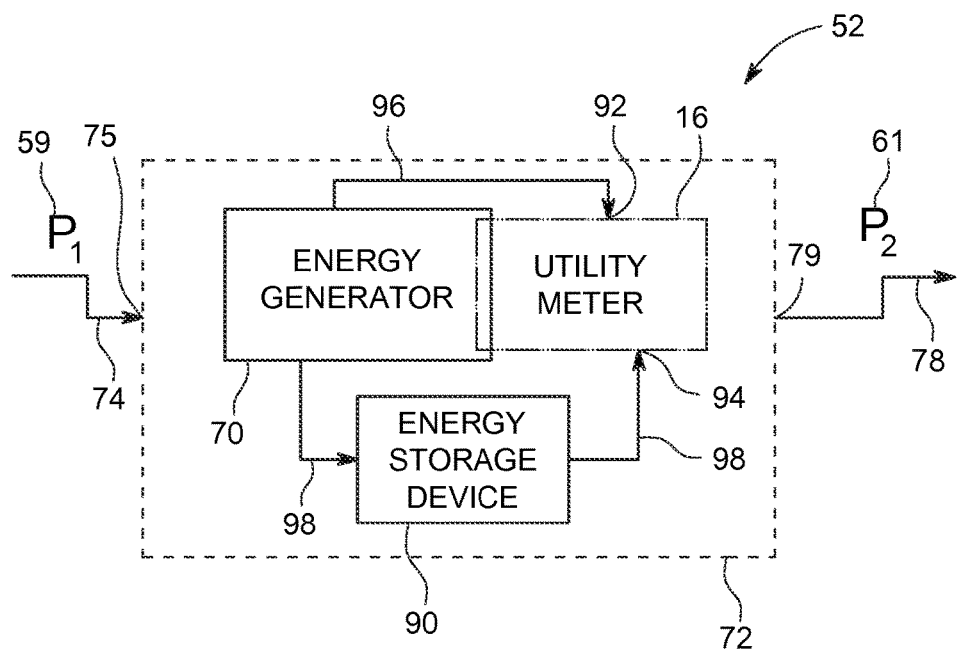
FIG. 7 illustrates a block diagram of the self-powered utility delivery system of FIG. 3 that includes an energy storage device, in accordance with an aspect of the present disclosure.

To prevent a lapse in power supply to the utility meter 16, an energy storage device 90 may be included in the self-powered utility delivery system 52, as shown in FIG. 7. The energy storage device 90 may be configured to receive power generated by the energy generator 70 and store such power until demanded by the utility meter 16. In certain embodiments, the energy storage device 90 may be coupled to the energy generator 70 and the utility meter 16 via wired electrical connections (e.g., power cords) that are configured to transfer electrical energy from the energy generator 70 to the energy storage device 90 and/or from the energy storage device 90 to the utility meter 16.

In certain embodiments, the energy storage device 90 may be an electrical storage device (e.g., a capacitor, an electrochemical capacitor, a supercapacitor), a chemical storage device (e.g., a lead-acid battery or a lithium-ion battery receiving electrical current from the energy generator 70), a mechanical storage device (e.g., a flywheel), an electromagnetic storage device, a betavoltaic storage device, or any combination thereof. The energy storage device 90 may be configured to receive energy during periods when little or no power is demanded by the utility meter 16 and/or when the energy generator 70 produces excess energy. For example, when the utility flowing through the energy generator 70 creates more electrical energy than an amount demanded by the utility meter 16, excess electrical energy may be directed toward the energy storage device 90. Conversely, when the energy generator 70 produces an amount of energy that is insufficient to power the utility meter 16 (e.g., when the utility is not flowing through the energy generator 70 or when the utility first starts flowing through the energy generator), electrical energy may be directed to the utility meter 16 from both the energy generator 70 and the energy storage device 90.

In certain embodiments, the utility meter 16 may include a first power input 92 and a second power input 94. For example, the self-powered utility delivery system 52 may include an energy bypass line 96 to enable power generated by the energy generator 70 to bypass the energy storage device 90. Accordingly, power may be supplied to the utility meter 16 directly from the energy generator 70 (e.g., via the first power input 92) and/or from the energy storage device 90 (e.g., via the second power input 94). In other embodiments, the utility meter 16 may include the first power input 92 but not the second power input 94. In such embodiments, the energy bypass line 96 and an energy supply line 98 from the energy storage device 90 may converge (e.g., join at a tee or other connector) such that the utility meter 16 includes a single power input. In still further embodiments, the self-powered utility delivery system 52 may not include the energy bypass line 96, and thus, some power from the energy generator 70 may flow through the energy storage device 90 without being stored for a substantial period of time when electrical energy is demanded by the utility meter 16. Accordingly, energy may be received by the utility meter 16 through the second power input 94, and the utility meter 16 may not include the first power input 92.

The amount of power produced by the energy generator 70 may at least partially determine a pressure of the utility exiting the self-powered utility delivery system 52. For example, as more power is produced by the energy generator 70, a pressure difference between the utility entering (e.g., via the inlet port 75) and exiting (e.g., via the outlet port 79) the self-powered utility delivery system 52 may increase (e.g., the pressure of the utility exiting the self-powered utility delivery system 52 decreases as more power is produced by the energy generator 70). Accordingly, it may be desirable to adjust the energy generator 70 and/or the self-powered utility delivery system 52 to consequently regulate the pressure of the utility exiting the self-powered utility delivery system 52 (e.g., ensure that the pressure meets flow consumption specifications).

Figure 8:
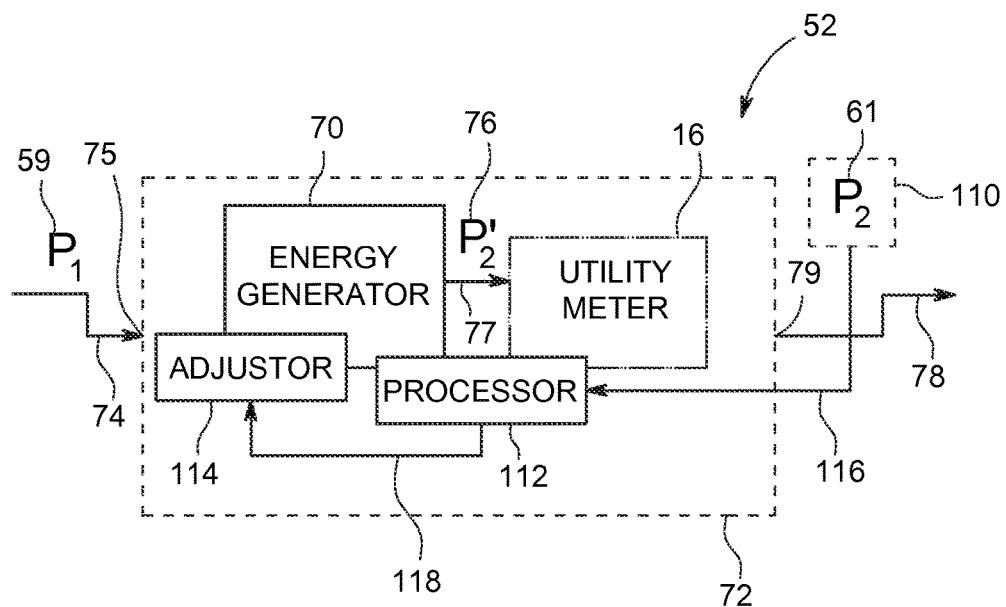
FIG. 8 illustrates a block diagram of the self-powered utility delivery system of FIG. 3 that includes a pressure sensor, a processor, and an adjustor, in accordance with an aspect of the present disclosure.

FIG. 8 illustrates an embodiment of the self-powered utility delivery system 52 that includes a pressure sensor 110 (e.g., a pressure transducer), a processor 112, and an adjustor 114. It should be noted that the processor 112 may be the same or different from the processor(s) 30 associated with the utility meter 16. In certain embodiments, the pressure sensor 110 is configured to monitor a pressure of the utility exiting the self-powered utility delivery system 52 via the outlet port 79 (e.g., the second pressure 61). For example, the pressure sensor 110 may determine a pressure value of the utility exiting the self-powered utility delivery system 52 and send feedback 116 indicative of such pressure to the processor 112. Accordingly, the processor 112 may compare the feedback received from the pressure sensor 110 to a predetermined pressure value. In some embodiments, the predetermined pressure value may correspond to a pressure that meets flow consumption specifications and enables the utility to be supplied to the consumer 12 at a suitable pressure. For example, the predetermined pressure value may be pre-programmed into the processor 112 based on the flow consumption specifications. Additionally or alternatively, a user interface of the self-powered utility delivery system 52 may enable a user or operator to enter a desired pressure value of the utility exiting the self-powered utility delivery system 52. It should be noted that in other embodiments, the pressure sensor 110 may monitor the intermediate pressure 76 of the utility downstream of the energy generator 70 and upstream of the utility meter 16. Accordingly, the pressure sensor 110 may send feedback to the processor 112 related to the intermediate pressure 76 of the utility within the self-powered utility delivery system 52.

In certain embodiments, when the pressure of the utility exiting the self-powered utility delivery system 52 is above the predetermined pressure value stored in the processor 112, the processor 112 may send a signal 118 to the adjustor 114. The adjustor 114 may then adjust (e.g., via one or more actuators) one or more valves or controls of the energy generator 70 to regulate an amount of power generated by the energy generator 70, which consequently adjusts the pressure of the utility exiting the self-powered utility delivery system 52. For example, the adjustor 114 may be configured to decrease a power output of the energy generator 70 by decreasing a flow rate of the utility through the self-powered utility delivery system 52. Accordingly, the energy generator 70 may include a valve that controls the flow rate of the utility through the energy generator 70, and thus, through the self-powered utility delivery system 52. In other embodiments, the adjustor 114 may be configured to regulate the energy generator 70 by adjusting other suitable control components.

In some embodiments, the pressure sensor 110, the processor 112, and/or the adjustor 114 may be electronic components such that one or more of such components operate using electricity. In such embodiments, the energy generator 70 may be configured to provide power to the sensor 110, the processor 112, and/or the adjustor 114 in addition to supplying power to the utility meter 16. Accordingly, the self-powered utility delivery system 52 may not include an external power supply.

Figure 9:
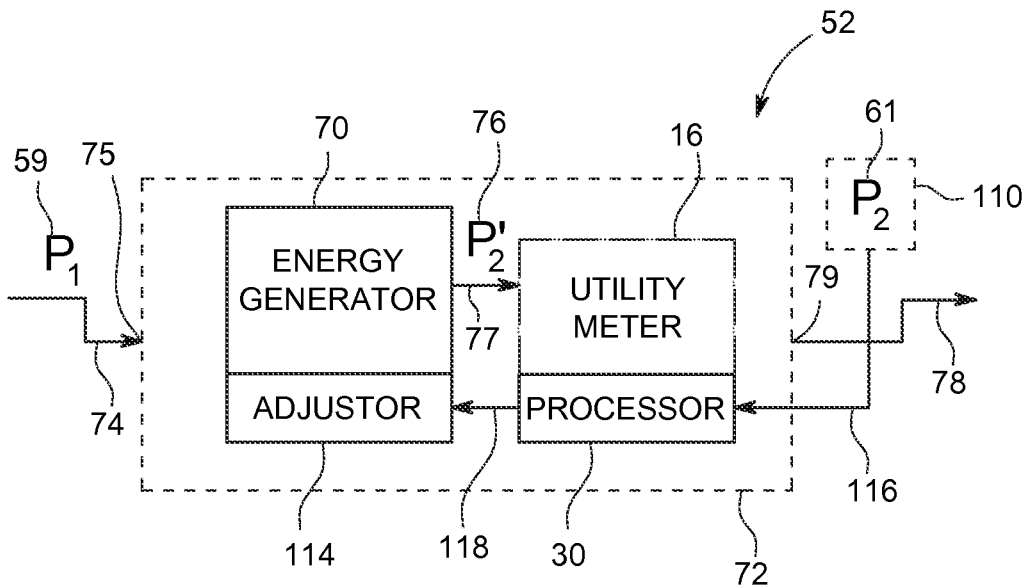
FIG. 9 illustrates a block diagram of the self-powered utility delivery system of FIG. 8 where the processor is coupled to the utility meter, in accordance with an aspect of the present disclosure.

In the illustrated embodiment of FIG. 8, the processor 112 and the adjustor 114 are components of the energy generator 70. Therefore, the energy generator 70 may receive the feedback from the pressure sensor 110 and internally send a signal to the adjustor 114 to either increase or decrease power output of the energy generator 70 based on the feedback 116. However, in other embodiments, the processor 112 may be a component of the utility meter 16 as opposed to the energy generator 70. For example, in the illustrated embodiment of FIG. 9, the self-powered utility delivery system 52 utilizes the processor 30 of the utility meter 16 rather than the separate processor 112 of FIG. 8. Additionally, in such embodiments, the energy generator 70 may supply power to the pressure sensor 110, the processor 30, and/or the adjustor 114.

Figure 10:
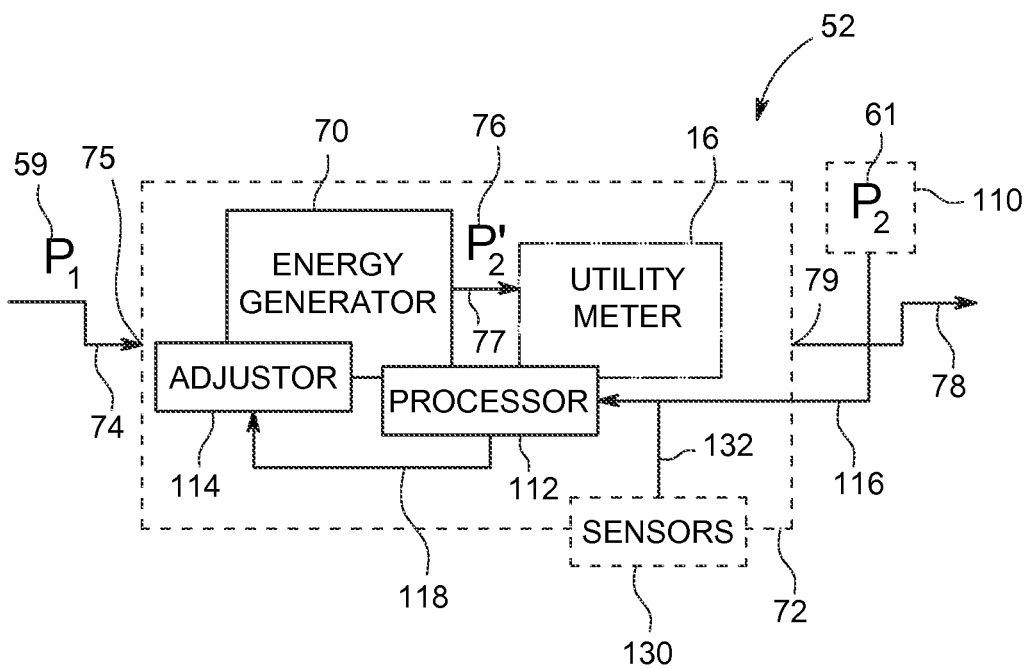
FIG. 10 illustrates a block diagram of the self-powered utility delivery system of FIG. 8 that includes an additional sensor, in accordance with an aspect of the present disclosure.

In some embodiments, the self-powered utility delivery system 52 may include sensors 130 in addition to the pressure sensor 110. For example, FIG. 10 illustrates the self-powered utility delivery system 52 that includes sensors 130. The sensors 130 may be used when the utility meter 16 is configured to account for variations in temperature or other environmental factors (e.g., pressure) to accurately monitor the quantity (e.g., volume) of the utility flowing through the self-powered utility delivery system 52. Therefore, the sensors 130 may include temperature sensors, pressure sensors (e.g., barometers), flow sensors (e.g., flow meters in the utility meter 16), or any combination thereof. In certain embodiments, the sensors 130 may send feedback 132 to the processor related to such environmental factors that may affect the accuracy of the utility meter 16. The sensors may also operate using electrical energy, and therefore, the energy generator 70 may be configured to produce sufficient electrical energy to supply the sensors 130 in addition to the pressure sensor 110, the processor 112, the adjustor 114, and/or the utility meter 16 with power.

Figure 11:
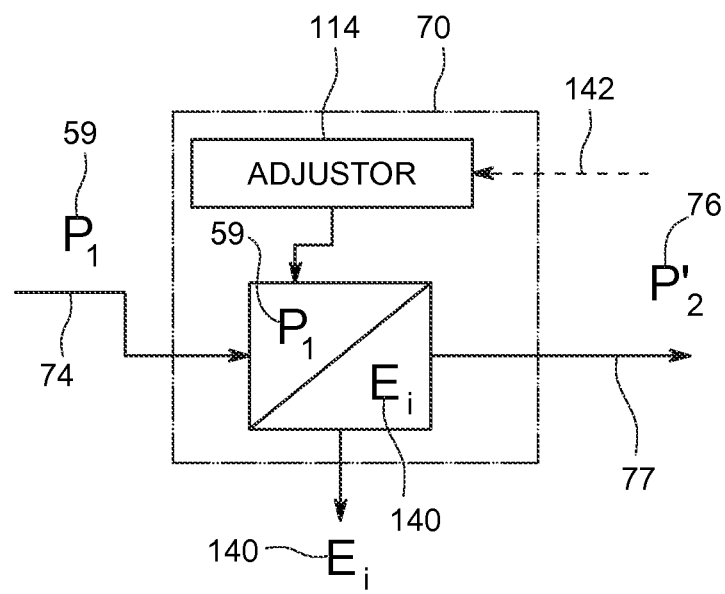
FIG. 11 illustrates a block diagram of the energy generator of FIG. 4 configured to directly convert a pressure of a utility to electrical energy, in accordance with an aspect of the present disclosure.

As discussed in detail above, the energy generator 70 may supply power to the various components of the self-powered utility delivery system 52. In certain embodiments, the energy generator 70 is configured to directly convert a dynamic pressure of the utility (e.g., natural gas or water) flowing through the self-powered utility delivery system 52 to electrical energy 140. For example, FIG. 11 illustrates an embodiment of the energy generator 70. The energy generator 70 receives the utility from the supply pipeline 58 (e.g., the supply flow 74) at the first pressure 59. The first pressure 59 and flow of the utility is then utilized to generate the electrical energy 140. As a result of the generation of the electrical energy 140, the utility exiting the energy generator 70 and directed toward the utility meter 16 may be at the intermediate pressure 76, where the intermediate pressure 76 is less than the first pressure 59.

Additionally, as shown in the illustrated embodiment of FIG. 11, the adjustor 114 may be included as a component of the energy generator 70. For example, the adjustor 114 may receive a signal 142 indicative of the second pressure 61 and/or a signal indicative of the intermediate pressure 76. The signal 142 may be sent from the processor 112 or another electronic device configured to send an electronic signal to the adjustor 114. In certain embodiments, the signal 142 received by the adjustor 114 may be wirelessly transmitted. In other embodiments, the adjustor 114 may be electronically coupled to the processor 112 or other electronic device via a cable or cord. The adjustor 114 may be configured to adjust the energy generator 70 so that the second pressure 61 and/or the intermediate pressure 76 of the utility is at a suitable level (e.g., a pressure that meets flow consumption specifications). For example, the adjustor 114 may actuate a control component of the energy generator 70 to vary the amount of electrical energy 140 generated such that the second pressure 61 corresponds to a desired consumption pressure.

In other embodiments, utilizing the first pressure 59 and/or flow of the utility through the energy generator 70 to generate the electrical energy 140 may not be a direct conversion. Accordingly, the energy generator 70 may be configured to transform the first pressure 59 and/or the flow of the utility through the energy generator 70 into an intermediate form of energy 144 via a first component 150, and then convert the intermediate form of energy 144 to the electrical energy 140 via a second component 152. As a non-limiting example, the intermediate form of energy 144 may be thermal energy, mechanical energy, flow dynamic energy, piezoelectric energy, magnetic energy, vibration energy, chemical energy, or any combination thereof. In certain embodiments, transforming the first pressure 59 and/or the flow of the utility through the energy generator 70 may result in a decrease in pressure such that the utility reaches a second intermediate pressure 154, where the second intermediate pressure 154 is less than the first pressure 59 but may be greater than the intermediate pressure 76. However, the intermediate form of energy 144 may not be suitable for providing power to the utility meter 16, the pressure sensor 110, the processor 112, the adjustor 114, and/or the additional sensors 130. Therefore, the energy generator 70 may convert the intermediate form of energy 144 to electrical energy 140 via the second component 152.

In certain embodiments, the second component 152 may include a generator (e.g., electric generator, a thermoelectronic generator), a battery, piezoelectrics, microelectromechanical systems (MEMS), or any combination thereof. Additionally, converting the intermediate form of energy 144 to electrical energy 140 may reduce the pressure of the utility even further. For example, the utility exiting the second component 152 may be at the intermediate pressure 76, where the intermediate pressure 76 is less than the second intermediate pressure 154. In some cases, the energy generator 70 may not have the ability to directly create electrical energy. Therefore, the second component 152 may enable the self-powered utility delivery system 52 to transform the intermediate form of energy 144 to electrical energy 140 and power the components of the self-powered utility delivery system 52.

Figure 12:
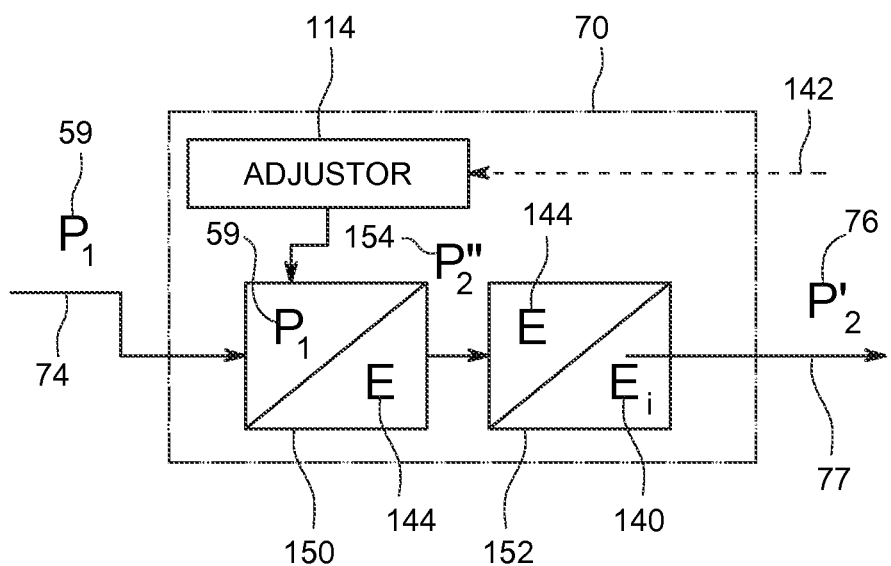
FIG. 12 illustrates a block diagram of the energy generator of FIG. 4 configured to convert a pressure of the utility to an intermediate form of energy and subsequently convert the intermediate form of energy to electrical energy, in accordance with an aspect of the present disclosure.

Additionally, as shown in the illustrated embodiment of FIG. 12, the adjustor 114 may be included as a component of the energy generator 70. For example, the adjustor 114 may receive the signal 142 indicative of the second pressure 61 and/or the intermediate pressure 76 of the utility. The signal 142 may be sent from the processor 112 or another electronic device configured to send an electronic signal to the adjustor 114. As shown in the illustrated embodiment of FIG. 12, the adjustor 114 may be coupled to the first component 150 such that the adjustor 114 is configured to adjust an amount of the intermediate form of energy 144 produced. In other embodiments, the adjustor 114 may be coupled to the second component 152 such that the adjustor 114 is configured to adjust an amount of the electrical energy 140 produced. In still further embodiments, the adjustor 114 may be coupled to both the first and second components 150, 152, such that the adjustor 114 is configured to adjust both the amount of the intermediate form of energy 144 and the amount of the electrical energy 140 produced.

Figure 13:
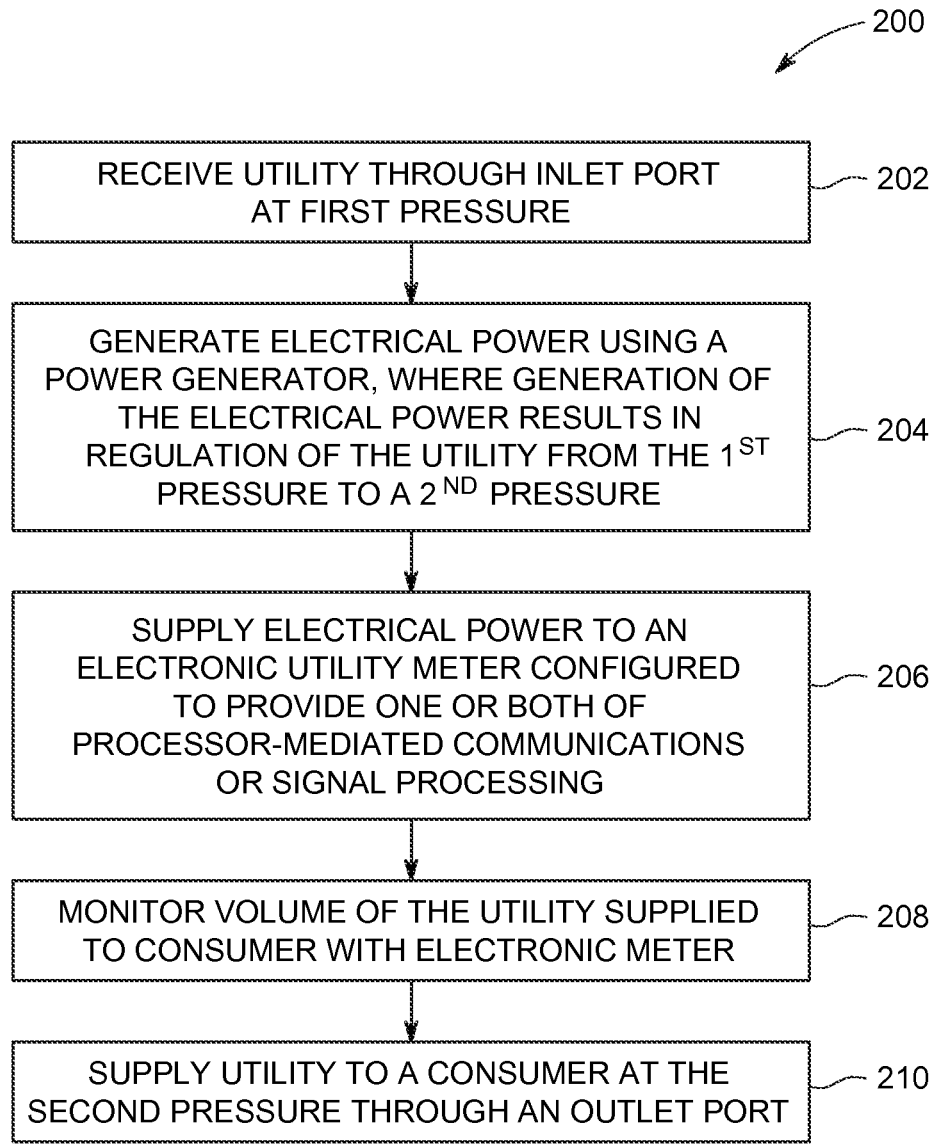
FIG. 13 illustrates an embodiment of a flow chart for a method to be performed by the self-powered utility delivery system of FIG. 3, in accordance with an aspect of the present disclosure.

FIG. 13 illustrates an embodiment of a flow chart 200 for a method to be performed by the self-powered utility delivery system 52. At a first block 202, the utility may be received via the inlet port 75 of the housing 72 of the self-powered utility delivery system 52. The utility may be at the first pressure 59 upon entering the inlet port 75, and in certain embodiments, the first pressure 59 may exceed flow consumption specifications. Accordingly, at block 204, the utility may flow through the energy generator 70, which may produce electrical energy, which may result in regulation of the pressure of the utility from the first pressure 59 to the second pressure 61 (or the intermediate pressure 76). The second pressure 61 may be at or below the flow consumption specifications such that the consumer 12 may receive the utility at a pressure suitable for consumption. At block 206, the energy generator 70 may convey the produced electrical energy to the utility meter 16 such that electronic components of the utility meter 16 may have power to operate. In certain embodiments, the utility meter 16 may be configured to provide one or both of processor-mediated communications and/or signal processing, as discussed previously.

At block 208, the utility meter 16 may monitor the volume of the utility flowing through the self-powered utility delivery system 52 via the meter inputs/filtering components 32, for example. Accordingly, the volume of the utility flowing through the self-powered utility delivery system 52 may be transmitted to the service provider 14 (e.g., via a wireless transmission over the communication network 20). The service provider 14 may then acquire the information necessary to bill the consumer 12 for the amount of utility (e.g., gas or water) utilized. Finally, at block 210, the utility may be delivered to the consumer 12 at the second pressure 61 via the outlet port 79.

Technical effects of the invention include a self-powered utility delivery system that may generate electrical energy and consequently regulate a pressure of utility flowing from a supply pipeline to a consumer. The electrical energy generated may be adequate to power an electronic utility meter or other monitoring device that determines how much of the utility is utilized or consumed by the consumer. Accordingly, the meter may enable a service provider to monitor utility consumption at a particular location (e.g., a commercial building or residential home) remotely.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A self-powered utility delivery system, comprising:
   an inlet port configured to receive a utility flowing through the self-powered utility delivery system at a first pressure;
   an outlet port configured to supply the utility at a second pressure, wherein the utility is configured to flow between the inlet port and the outlet port;
   an electronic utility meter providing one or both of processor-mediated communications or signal processing and configured to measure the utility supplied from the outlet port;
   an energy generator configured to convert a pressure of the utility to generate electrical power and consequently to regulate the pressure of the utility from the first pressure to the second pressure, wherein the second pressure is predetermined, wherein the energy generator supplies a portion of the electrical power to an energy storage device; and
   a processor operatively coupled to the energy generator, wherein the energy generator comprises an adjustor configured to control an amount of the electrical power generated in response to feedback received by the processor.

2. The self-powered utility delivery system of claim 1, wherein the first pressure is a pressure supplied by a service provider and the second pressure is a consumption pressure specified by a standard, a regulation, a specification, or any combination thereof.

3. The self-powered utility delivery system of claim 2, wherein the outlet port is configured to supply the utility at a flow rate conforming to flow consumption specifications.

4. The self-powered utility delivery system of claim 1, wherein the electronic utility meter is configured to measure one or both of a volume and a flow rate of the utility supplied from the outlet port.

5. The self-powered utility delivery system of claim 1, wherein the one or both of processor-mediated communications or signal processing comprises electronic measurement, flow sensing, volume flow metering, volume conversion to base condition processing, self-diagnostics, electronic display, meter correction, communication of meter output, automatic meter reading, another form of electrical processing, or any combination thereof.

6. The self-powered utility delivery system of claim 1, comprising a housing configured to receive the electronic utility meter and the energy generator, and wherein the housing is coupled to the inlet port and the outlet port.

7. The self-powered utility delivery system of claim 1, wherein the electrical power is sufficient to power the electronic utility meter.

8. The self-powered utility delivery system of claim 1, wherein the energy storage device comprises an electrical storage device, a chemical storage device, a mechanical storage device, an electromagnetic storage device, a betavoltaic storage device, or any combination thereof.

9. The self-powered utility delivery system of claim 1, wherein the processor is operatively coupled to at least one sensor.

10. The self-powered utility delivery system of claim 1, wherein at least one of the electronic utility meter and the energy generator comprise the processor.

11. The self-powered utility delivery system of claim 1, wherein the adjustor is configured to modify an amount of the electrical power based at least on a measure of one or more of the second pressure, a flow rate, or a flow volume of the utility supplied from the outlet port received by the processor.

12. The self-powered utility delivery system of claim 11, wherein at least one sensor operatively coupled to the processor provides the measure of one or more of the second pressure, the flow rate, or the flow volume of the utility supplied from the outlet port to the processor.

13. The self-powered utility delivery system of claim 1, wherein the energy generator comprises the electronic utility meter.

14. The self-powered utility delivery system of claim 1, wherein the utility is natural gas.

15. The self-powered utility delivery system of claim 1, wherein the energy generator is configured to generate the electrical power by converting a pressure change of the utility into an intermediate form of energy, and wherein the intermediate form of energy comprises thermal energy, mechanical energy, flow dynamic energy, piezoelectric energy, magnetic energy, vibration energy, chemical energy, or any combination thereof.

16. The self-powered utility delivery system of claim 15, wherein the pressure change of the utility is a pressure drop internal to a housing, and wherein the pressure drop is a difference between the first pressure and the second pressure.

17. The self-powered utility delivery system of claim 1, wherein the energy generator generates a pressure change by converting the first pressure into an intermediate form of energy and converting the intermediate form of energy into the electrical power, and wherein the intermediate form of energy comprises thermal energy, mechanical energy, flow dynamic energy, piezoelectric energy, magnetic energy, vibration energy, chemical energy, or any combination thereof.

18. The self-powered utility delivery system of claim 1, wherein the energy generator is configured to provide the electrical power to sensors, and wherein the sensors are configured to be used in the electronic utility meter.

19. A method, comprising:
- receiving a utility through an inlet port, wherein the utility is at a first pressure;
- converting a pressure of the utility and thereby generating electrical power using a power generator and consequently regulating the pressure of the utility from the first pressure to a predetermined second pressure, wherein the power generator supplies a portion of the electrical power to an energy storage device;
- operatively coupling a processor to the power generator, wherein the power generator comprises an adjustor configured to control an amount of the electrical power generated in response to feedback received by the processor;
- supplying the electrical power to an electronic utility meter, wherein the electronic utility meter is configured to provide one or both of processor-mediated communications or signal processing;
- monitoring a volume of the utility supplied to a consumer using the electronic utility meter; and
- supplying the utility to the consumer at the second pressure through an outlet port.

* * * * *